2 Sheets—Sheet 1.

C. H. REID.

CHUCK.

No. 10,766. Reissued Sept. 21, 1886.

Witnesses
S. A. Williamson
W. T. Hairland

Inventor
Charles H. Reid
By Smith & Hubbard
Att'ys.

C. H. REID.

CHUCK.

No. 10,766. Reissued Sept. 21, 1886.

Witnesses
S. S. Williamson
W. T. Haviland

Inventor
Charles H. Reid
By Smith & Hubbard
Attys.

UNITED STATES PATENT OFFICE.

CHARLES H. REID, OF DANBURY, CONNECTICUT.

CHUCK.

SPECIFICATION forming part of Reissued Letters Patent No. 10,766, dated September 21, 1886.

Original No. 301,277, dated July 1, 1884. Application for reissue filed January 28, 1886. Serial No. 190,114.

*To all whom it may concern:*

Be it known that I, CHARLES H. REID, a citizen of the United States, residing at Danbury, Fairfield county, and State of Connecticut, have invented certain new and useful Improvements in Chucks; and I do hereby declare the following to be a full, clear, and exact description of the invention, such as will enable others skilled in the art to which it appertains to make and use the same.

My invention relates to certain novel and useful improvements in chucks, and has for its object to provide such a device in which the jaws may be spread or closed by the action of a screw, while at the same time the screw shall be so constructed and arranged that an adequate bearing-surface is presented, which prevents the too rapid wearing away of the screw at the point or points where it comes in contact with or abuts against the frame of the chuck; to distribute the strain of the screw-thread against its bearing, while work is being performed, throughout a greater length of thread, and also to provide means for accurately centering the work of or determining the position of the jaws at any desired point; and with these ends in view my invention consists in the details of construction and combination of elements hereinafter fully and in detail explained, and then specifically designated by the claims.

In order that those skilled in the art to which my invention appertains may more fully understand its construction and operation, I will proceed to describe the same in detail, referring by letters to the accompanying drawings, forming a part of this specification, in which—

Figure 1:
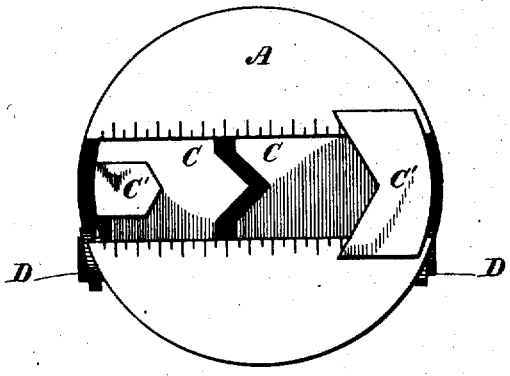
Figure 2:
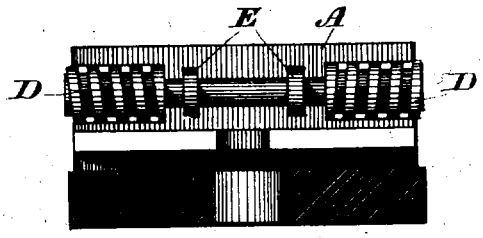
Figure 3:
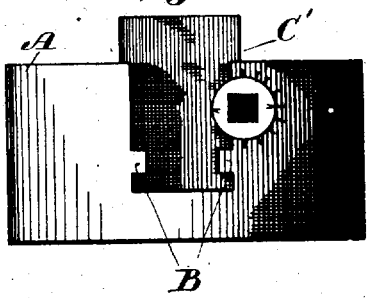
Figure 4:
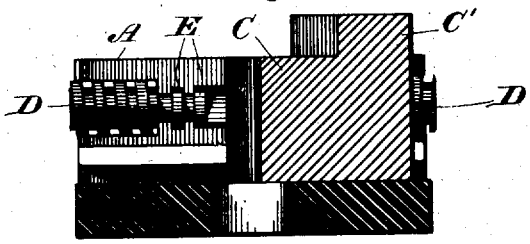
Figure 5:
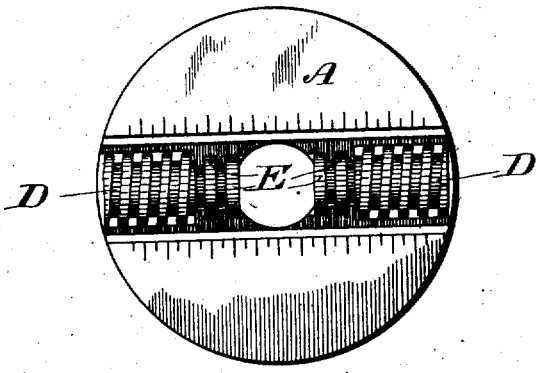
Figure 6:
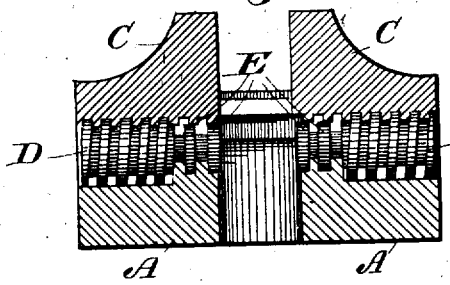
Figure 7:
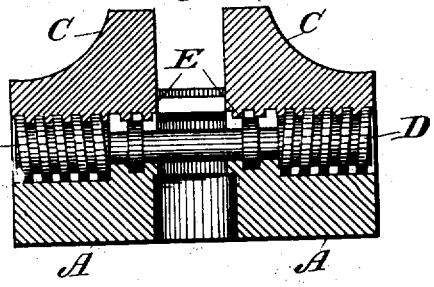
Figure 8:
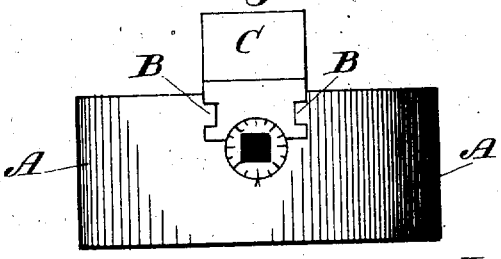

Figure 1 is a plan view of my improvement; Fig. 2, a vertical section through the chuck-frame with the jaws removed, showing the position of the screw within said frame; Fig. 3, a side elevation showing the position of the jaws within the frame and the graduations around the head of the screw; Fig. 4, a central vertical section with one jaw removed, illustrating two screws and the collars thereon and their relation to the frame; Fig. 5, a modification showing two screws in the center of the frame, with the jaws removed; Fig. 6, a sectional view showing two screws arranged centrally of the frame and any ordinary jaws in connection therewith; Fig. 7, a view similar to Fig. 6, but with a single screw; and Fig. 8 a side elevation showing the position of a central screw with graduations thereon.

Similar letters denote like parts in the several figures of the drawings.

A is the frame of the chuck, recessed, and having suitable bearings, B, for the jaws C.

D is a screw located within the frame at the side of the opening for the jaws. The jaws C are provided with screw-threads at their sides of a nature opposite to that of the thread on the screw itself, and are inserted within the frame on their proper bearings until their threads are in engagement with the screw. The threads on the latter are right and left handed, and will of course draw the jaws together or spread them apart, as the case may be.

In chucks of this class as heretofore constructed the strain comes on the threads of the screw and upon the rear shoulders of the screw-shank, which abut against the chuck-frame. This is a serious disadvantage, as said shoulders become so worn by constant use that the play between the screw and the frame occasioned by said wear permits a longitudinal movement of the jaws and the work held thereby, thus destroying the usefulness of the chuck; also, as but a small number of the threads of the screw were in engagement with the jaws, the wear on the former soon developed sufficient lost motion between the screw and jaws to prevent the accurate centering of the latter, which caused much annoyance. To avoid these disadvantages I provide two collars, E, near the center of the screw-shank, and form corresponding recesses in the chuck-frame within which the said collars snugly fit, and extend the threads of the screw out flush with the frame of the chuck. This gives a greater number of bearing-surfaces between the screw and frame, and at the same time enables the number of threads in engagement with the jaws to be increased, thus distributing the wear over a greater amount of surface.

When work is being done—such as turning or cutting off—the advantage of the collar is most apparent, as there is considerable longitudinal thrust on the screw every time the jaws come in alignment with the tool, and consequently the bearings of the screw must resist and take up this thrust.

It often becomes necessary in practice to hammer the work held by the chuck for the purpose of straightening the same, and when this hammering is in line with the movement of the jaws the collars have to withstand the entire shock.

It will be readily understood that when work is clamped by the jaws there is no wear whatever on the collars, since the strain on the screw in opposite directions is equalized, and the resistance offered by the jaws is sustained entirely by the threads. If desired, two independent screws may be used in connection with the jaws, and in this case I would provide two independent collars on the extreme inner ends of said screws, as shown in Figs. 4, 5, and 6.

The principle involved in the operation of the two independent screws is the same as the principle which underlies the operation of the single screw, since it is evident that when there is any resistance against the jaws—as the holding of work—the strain on the threads would of course tend to force the independent screws backward; but this is prevented by the abutment of the collars against the walls of the recesses in the frame, and, this strain being divided at the inner ends of the screws between the said collars, it follows that the wear on the screws is less effective, while at the same time I am enabled to carry the threads on the screws to the extreme rear ends of the latter, thereby distributing the strain on the thread over a greater number of threads to the inch, as in the case of the single screw; and when the work is extremely heavy, and the jaws accordingly set back further, this advantage is more apparent.

In assembling the several parts of my improvement, I place the screw or screws, as the case may be, within the recessed frame, insert the jaws within the said frame on their proper bearings, and then operate the screws until an engagement is effected with the threaded jaws.

By placing a scale along the face of the frame close to the line of travel of the jaws, as seen at Fig. 1, and a series of graduations on the frame around the head of the screw, as seen at Fig. 3, I am enabled to determine any desired adjustment of the jaws or to center the work accurately. The jaws C at their forward portions are made flush with the face of the chuck-frame, and their rear portions are integral with a second pair of jaws, C′, which lie above the plane of the former jaws. Should it become desirable to utilize the chuck for heavy work the jaws C′ are used, their operation of course being controlled from the same source as in the case of the jaws C.

It will be readily understood that when a single screw is used but two collars or shoulders are needed, as the strain is distributed on all four sides of said collars, and has a tendency toward equalization. I am enabled to use two independent screws, constructed and arranged as shown at Figs. 4, 5, and 6, in which case the graduations would be around the head of each screw, and the movements of the jaws and the adjustments of the same be independent. If two screws are used, I prefer to use two collars on each screw, because the strain is all in one direction, and the greater the number of collars, provided enough screw-threads to the inch are allowed on the screw-shanks, the less will the wear affect the screw.

Having thus described my invention, what I claim as new, and desire to secure by Letters Patent, is—

1. In a chuck, as described, the jaws actuated by independent screws, the latter being provided at their inner ends with collars or shoulders which abut or bear against the frame of the chuck, whereby the strain on the screws may be distributed over a greater number of bearing-surfaces, substantially as set forth.

2. In a chuck, the independent screws threaded and provided at their inner ends with shoulders, in combination with the jaws and frame, substantially as set forth.

3. In combination with the frame of the chuck, recessed, as described, and the threaded jaws, the independent actuating screws provided with collars at their inner extremities, and with the threads extended to their outer extremities, whereby the strain on the body of the screws may be divided between a greater number of bearing-surfaces, and the strain on the threads distributed among a greater number of threads, substantially as set forth.

Witness my hand this 12th day of December, 1885.

CHARLES H. REID.

In presence of—
S. S. WILLIAMSON,
E. STUART SUMNER.